United States Patent
Moriki et al.

(10) Patent No.: US 9,556,590 B2
(45) Date of Patent: Jan. 31, 2017

(54) CONSTRUCTION VEHICLE

(71) Applicant: HITACHI CONSTRUCTION MACHINERY CO., LTD., Tokyo (JP)

(72) Inventors: Hidekazu Moriki, Tokyo (JP); Satoru Kaneko, Tokyo (JP); Noritaka Itou, Tsuchiura (JP); Kazuo Ishida, Tsuchiura (JP); Toshio Kotaka, Tsuchiura (JP); Satoshi Sekino, Tsuchiura (JP); Toru Kikuchi, Tsuchiura (JP); Masaki Higurashi, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 267 days.

(21) Appl. No.: 14/405,407

(22) PCT Filed: Jun. 3, 2013

(86) PCT No.: PCT/JP2013/065383
§ 371 (c)(1),
(2) Date: Dec. 4, 2014

(87) PCT Pub. No.: WO2013/183595
PCT Pub. Date: Dec. 12, 2013

(65) Prior Publication Data
US 2015/0139767 A1    May 21, 2015

(30) Foreign Application Priority Data

Jun. 4, 2012 (JP) ................................. 2012-127442

(51) Int. Cl.
*E02F 9/20* (2006.01)
*E02F 9/26* (2006.01)
(Continued)

(52) U.S. Cl.
CPC ............... *E02F 9/2062* (2013.01); *B60K 6/46* (2013.01); *B60W 10/30* (2013.01);
(Continued)

(58) Field of Classification Search
CPC ..... B60K 6/46; B60W 10/30; B60W 2510/30; B60W 30/18172; Y10T 10/6217; E02F 3/283; E02F 3/431; E02F 9/2062; E02F 9/2066; E02F 9/22; E02F 9/2253; E02F 9/226; E02F 9/2296; E02F 9/267; E02F 9/268; F15B 20/004; F15B 2211/8633; F15B 2211/864; F15B 2211/87; F15B 2211/875; F15B 2211/8752

See application file for complete search history.

(56) References Cited

FOREIGN PATENT DOCUMENTS

| JP | 5-106245 A | 4/1993 |
|---|---|---|
| JP | 6-193097 A | 7/1994 |

(Continued)

*Primary Examiner* — Logan Kraft
(74) *Attorney, Agent, or Firm* — Baker Botts L.L.P.

(57) ABSTRACT

This invention includes a hydraulic pump (9), a working implement (107) having a lift cylinder (13) driven by a hydraulic fluid supplied from the hydraulic pump (9), an operating device (104) for operating the working implement (107), a traveling motor (7) for driving wheels, and a main controller (100). When the lift cylinder (13) fails to operate despite an extending instruction being imparted to the lift cylinder (13) via the operating device (104), the main controller (100) reduces a limit value for an increase rate of a torque required in the traveling motor (7) to a value smaller than that applied when the lift cylinder (13) operates. With this configuration, occurrence of wheel slip during lifting of an object to be carried can be reduced.

5 Claims, 8 Drawing Sheets

(51) Int. Cl.
    *E02F 9/22*     (2006.01)
    *E02F 3/43*     (2006.01)
    *E02F 3/28*     (2006.01)
    *B60K 6/46*     (2007.10)
    *B60W 10/30*     (2006.01)
    *B60W 30/18*     (2012.01)

(52) U.S. Cl.
    CPC ....... *B60W 30/18172* (2013.01); *E02F 3/283* (2013.01); *E02F 3/431* (2013.01); *E02F 9/2066* (2013.01); *E02F 9/22* (2013.01); *E02F 9/2253* (2013.01); *E02F 9/2296* (2013.01); *E02F 9/268* (2013.01); *B60W 2510/30* (2013.01); *F15B 2211/864* (2013.01); *F15B 2211/875* (2013.01); *Y02T 10/6217* (2013.01)

(56) References Cited

FOREIGN PATENT DOCUMENTS

| | | |
|---|---|---|
| JP | 2008-223858 A | 9/2008 |
| JP | 2010-25179 A | 2/2010 |
| JP | 5129493 B2 | 11/2012 |

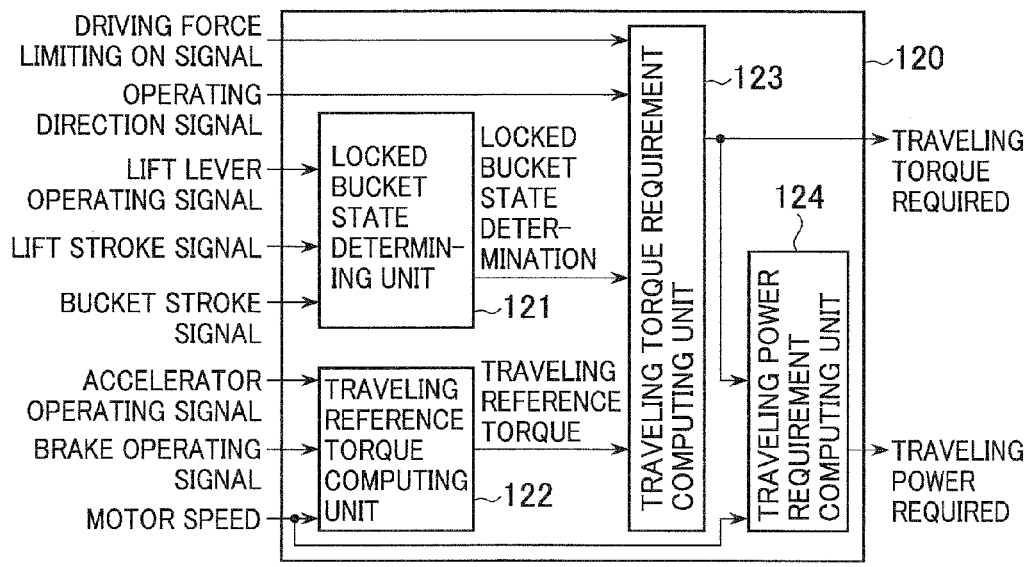
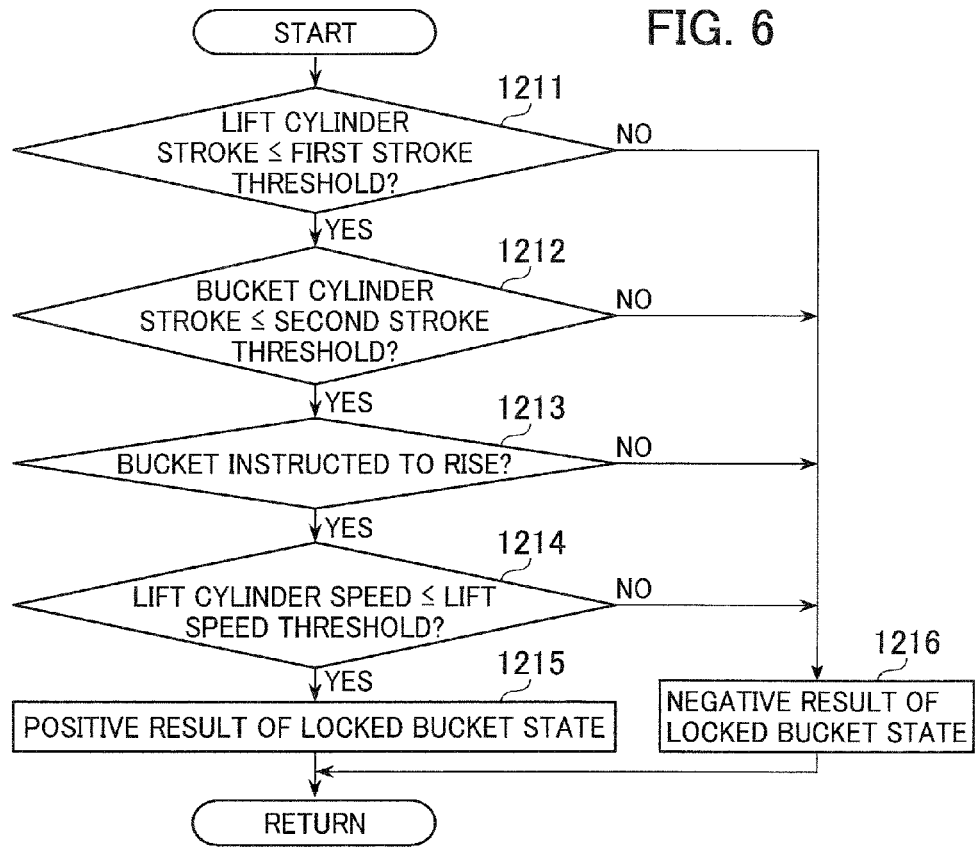

| TORQUE INCREASE RATE LIMIT | DRIVING FORCE LIMITING ON SIGNAL | LOCKED BUCKET STATE DETER-MINATION |
|---|---|---|
| A | INACTIVE | NEGATIVE |
| A | INACTIVE | POSITIVE |
| A | ACTIVE | NEGATIVE |
| B | ACTIVE | POSITIVE |

| TORQUE INCREASE RATE LIMIT | DRIVING FORCE LIMITING ON SIGNAL | LOCKED BUCKET STATE DETER-MINATION |
|---|---|---|
| A | INACTIVE | NEGATIVE |
| A | INACTIVE | POSITIVE |
| A | ACTIVE | NEGATIVE |
| B' | ACTIVE | POSITIVE |

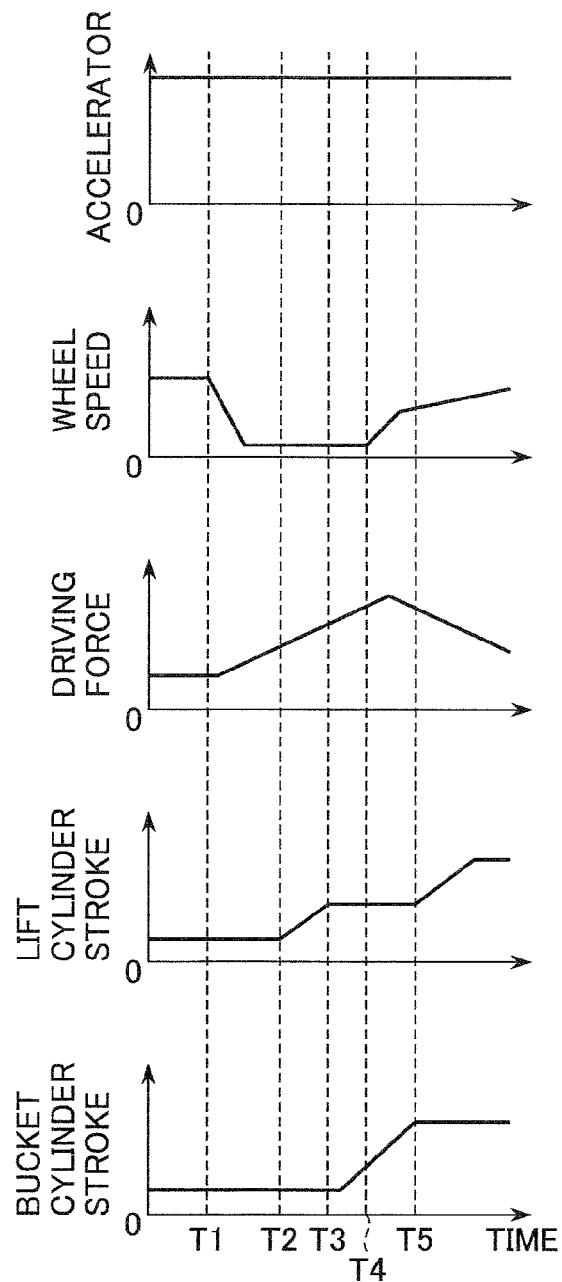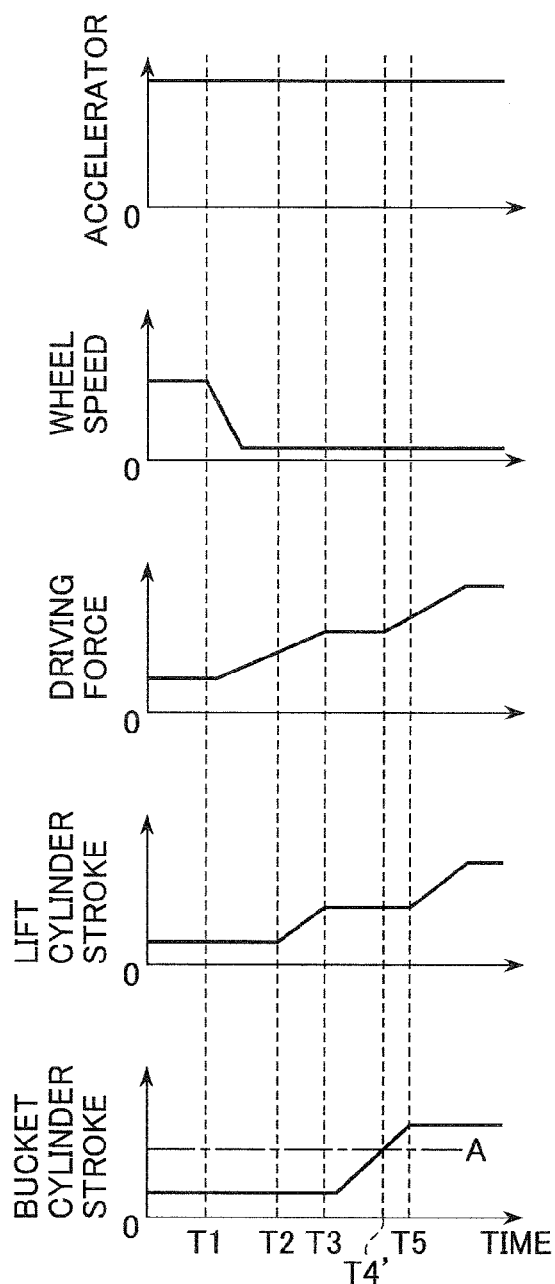

CONSTRUCTION VEHICLE

TECHNICAL FIELD

The present invention relates to construction vehicles including a working implement.

BACKGROUND ART

Some construction vehicles include a traveling drive device for wheel driving and a working implement mounted on an anterior section of the vehicle, the working implement being driven by a hydraulic fluid supplied from a hydraulic pump. Among these types of construction vehicles are those in which a force generated when the working implement lifts an object to be carried will act upon the vehicle as a counteraction from the object. Wheel loaders and forklift trucks, for example, correspond to such construction vehicles.

Wheel loaders have an articulated type of working implement, inclusive of a bucket and a lift arm, on an anterior section of the vehicle. The wheel loaders apply a driving force to the wheels via the traveling drive device, with the bucket plunging into the object, then raise the bucket to excavate the soil. At this time, the wheels increase in ground contact pressure since the force that raises the bucket works upon the vehicle body as the counteraction from the object. As the ground contact pressure of the wheels increases, maximum frictional force between the wheels and the ground surface increases, so that when the bucket is being raised, occurrence of wheel slip tends to be reduced below a level at which the bucket is not being raised.

If the excavating counteraction is small and the driving force is large, however, the wheels may slip because of insufficient frictional force. In addition, the slipping of the wheels may involve scraping against the road surface to make it rough and thus to significantly reduce subsequent working efficiency of the vehicle. For example, in a wheel loader having a torque converter type of automatic transmission (hereinafter, this construction vehicle may be termed the conventional type of wheel loader), since the torque converter yields an increase in output torque with an engine speed, an operator predicts a magnitude of the driving force from parameters such as the engine speed, and performs excavation while balancing the extracting counteraction and the driving force appropriately for suppressed wheel slip. Skill is needed to balance the extracting counteraction and the driving force. Conversely to the above, if the driving force is too small, the bucket may fail to plunge into the object deeply. In this case, the amount of object that the bucket can scoop may reduce, thus the workload per unit time may also reduced.

While known traction control for automotive use would be applied to suppress the wheel slip generated when a construction vehicle is operated as above, occurrence of initial slip is likely to be unavoidable since the driving force is limited only after the occurrence of the slip has been detected.

In order to prevent wheel slip from occurring, therefore, Patent Document 1 discloses a wheel loader that includes traveling control means to detect a position of a bucket and an excavating counteraction (load), then calculate a rotational moment of a working implement, based upon the detected position and excavating counteraction, and limit a driving force according to the particular rotational moment.

PRIOR ART DOCUMENTS

Patent Document

Patent Document 1: JP-1994-193097-A

SUMMARY OF THE INVENTION

Problem to be Solved by the Invention

It is known that too deep plunging of a bucket into an object to be carried will generate an excessive excavating counteraction, thereby resulting in failure to raise the bucket itself. The wheel loader described in Patent Document 1, however, determines that wheels have a higher ground-contact pressure when the bucket is generating a larger excavating counteraction, and increases driving force by increasing a limit value for the driving force. This tends to cause even deeper plunging of the bucket, thus making it more difficult to raise the bucket. Wheel slipping could also result because the driving force is increased.

In addition, in recent years is proposed a hybrid type of wheel loader including an engine, an electrical generator motor mechanically coupled to an output shaft of the engine, a motor powered by electrical energy supplied from the generator motor, and an electrical storage device that exchanges electrical power with the generator motor and the electrically powered motor (hereinafter, this construction vehicle may be referred to simply as "the hybrid wheel loader"). The hybrid wheel loader differs from the conventional type of wheel loader in that the engine speed does not have a direct operative association with a driving force. Additionally, a maximum output driving force that can be developed may differ according to a particular residual amount of energy within the electrical energy storage device. This could lead to failure for an operator to balance an excavating counteraction and a driving force.

An object of the present invention is to provide a construction vehicle adapted to suppress occurrence of wheel slip during raising of an object to be carried.

Means for Solving the Problem

To achieve the above object, the construction vehicle according to an aspect of the present invention includes a hydraulic pump, a working implement having a hydraulic actuator driven by a hydraulic fluid supplied from the hydraulic pump, an operating device for operating the working implement, a traveling drive device for driving wheels, and control means that if the hydraulic actuator fails to operate despite an operating instruction being imparted to the actuator via the operating device, reduces a limit value for a rate at which a torque required of the traveling drive device increases.

Effect of the Invention

In the present invention, the occurrence of wheel slip during the raising of the object to be carried can be reduced.

BRIEF DESCRIPTION OF THE DRAWINGS

FIG. 5 is a configuration diagram of a traveling requirement computing unit 120 in the first embodiment of the present invention.

FIG. 6 is a flowchart of locked bucket state determination in the first embodiment of the present invention.

FIG. 10 is a diagram showing variations with time of accelerator pedal operation amount, wheel speed, driving force of a traveling motor, stroke length of a lift cylinder, and stroke length of a bucket cylinder.

MODE FOR CARRYING OUT THE INVENTION

Figure 1:
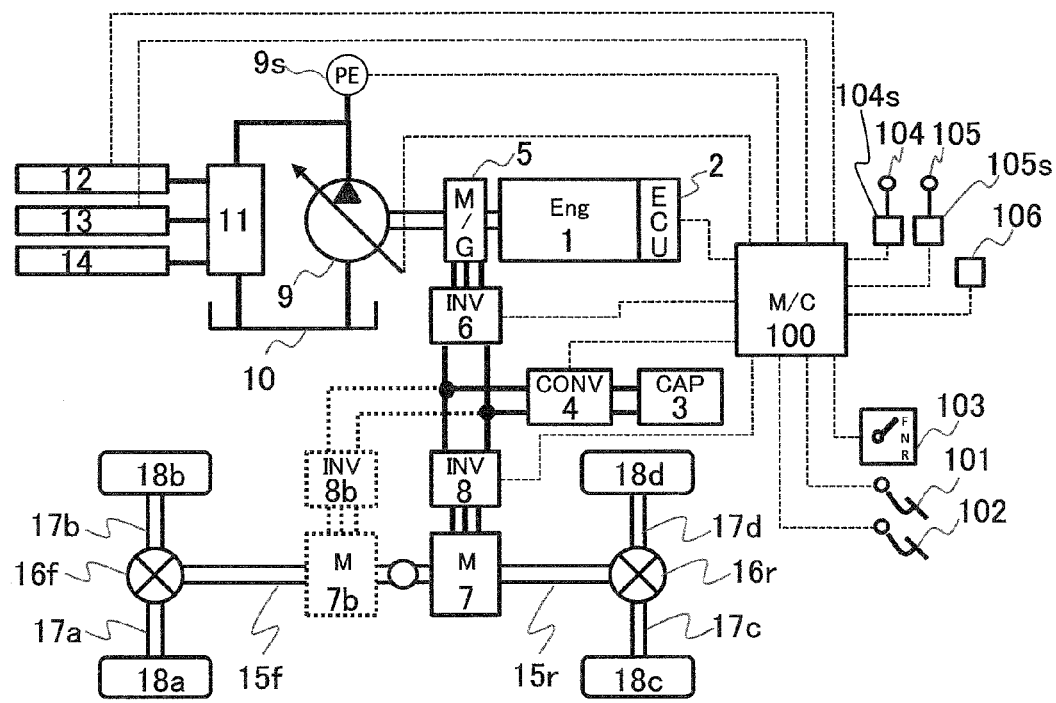
FIG. 1 is a configuration diagram of a construction vehicle according to a first embodiment of the present invention.

Hereunder, embodiments of the present invention will be described using the accompanying drawings. FIG. 1 is a configuration diagram of a construction vehicle according to a first embodiment of the present invention. The present embodiment is an application of the invention to the hybrid type of construction vehicle (wheel loader). The construction vehicle according to the present embodiment includes a main controller 100, an engine 1, an engine controller (engine control unit) 2 for controlling the engine 1, a capacitor 3 as an electrical energy storage device, a converter 4 that controls charge/discharge of the capacitor 3, an electrical generator motor 5 connected mechanically to the engine 1 so as to enable torque transmission, an electricity-generating inverter 6 for driving the generator motor 5, traveling motors 7, 7b that power-run on electrical energy supplied from the generator motor 5 and the capacitor 3, and traveling inverters 8, 8b for driving the traveling motors 7, 7b, respectively.

The converter 4, electricity-generating inverter 6, and traveling inverters 8, 8b here are connected to the same electrical power line, and can supply electrical power to each other. The converter 4 also monitors a voltage of a smoothing capacitor connected to the power line, this capacitor not being shown, and charges/discharges the capacitor 3 so as to keep the voltage of the smoothing capacitor constant.

In addition, the construction vehicle according to the present embodiment includes a main pump (hydraulic pump) 9 connected mechanically to the engine 1 and the generator motor 5, an oil tank 10 for supplying a hydraulic fluid to the main pump 9, a control valve 11 that distributes the hydraulic fluid that the main pump 9 has delivered, and a steering cylinder (hydraulic cylinder) 12, lift cylinder (hydraulic cylinder) 13, and bucket cylinder (hydraulic cylinder) 14 each extends and retracts by the fluid distributed from the control valve 11.

The main pump 9 is a variable displacement type of pump, adapted so that adjustment of a tilting angle by means of a tilting angle control valve not shown allows a capacity of the pump to be changed according to needs, and hence a delivery flow rate with respect to the same engine speed to be controlled.

The construction vehicle according to the present embodiment further includes a lift lever 104 and bucket lever 105 collectively as a device for operating a working implement 107 (see FIG. 2) that includes the lift cylinder 13 and the bucket cylinder 14. The lift lever 104 and the bucket lever 105 are each connected to the control valve 11 on a hydraulic circuit not shown, and as these levers are operated, the control valve 11 correspondingly operates. The lift cylinder 13 and the bucket cylinder 14 each operate as the control valve 11 operates.

An accelerator pedal 101, a brake pedal 102, and a forward/reverse traveling selector switch 103 are connected to the main controller 100, and the three elements send an accelerator signal, a brake signal, and an operating direction signal, respectively, to the main controller 100.

A pump pressure sensor 9s on a fluid delivery hydraulic circuit of the main pump 100 is also connected to the main controller 100, and the main controller 100 receives a main pump pressure signal from the pump pressure sensor 9s.

In addition, a lift potentiometer 104s, mounted as bucket raising instruction acquisition means on the lift lever 104, and a bucket potentiometer 105s, mounted on the bucket lever 105, are connected to the main controller 100, and the main controller 100 receives a lift lever operating signal from the lift potentiometer 104s and a bucket lever operating signal from the bucket potentiometer 105s. While the present embodiment uses the potentiometers 104s, 105s to detect the operation amounts of the levers 104, 105, the operation amounts of the levers 104, 105 may be detected using any other method such as detecting with a pressure sensor an output pilot pressure (hydraulic signal) that will be developed according to the particular operation amount of the lever 104 or 105.

Furthermore, a lift stroke sensor 13s, mounted as bucket height acquisition means (see FIG. 2) on the lift cylinder 13, and a bucket stroke sensor 14s, mounted as bucket posture acquisition means (see FIG. 2) on the bucket cylinder 13, are connected to the main controller 100. The main controller 100 receives from the lift stroke sensor 13s a lift stroke signal that indicates stroke length of the lift cylinder 13, and receives a bucket stroke signal that indicates stroke length of the bucket cylinder 14.

Moreover, the engine controller 2, the converter 4, the electricity-generating inverter 6, and the traveling inverters 8, 8b are connected to the main controller 100. The main controller 100 receives a rotating speed of the engine 1 from the engine controller 2, an electrical energy storage voltage of the capacitor 3 from the converter 4, and motor speed of the traveling motors 7, 7b from the traveling inverters 8, 8b. The main controller 100 then transmits an engine speed command to the engine controller 2, a generator motor torque command to the power-generating inverter 6, and a motor torque command to the traveling inverters 8, 8b.

Besides, a driving force limiting switch 106 for ON/OFF switching of a driving force limiting process described later herein is connected to the main controller 100, and the main controller 100 receives a driving force limiting ON signal that is output from the driving force limiting switch 106 when the driving force limiting process is an ON state.

The construction vehicle according to the present embodiment additionally includes a traveling motor 7 that operates as a traveling drive device to drive tires (wheels) 18a, 18b, 18c, 18d mounted on the vehicle body. The construction vehicle further includes propeller shafts 15f, 15r coupled mechanically to an output shaft of the traveling motor 7, differential gears 16f, 16r that receive output power supplied from the propeller shafts 15f, 15r, and drive shafts 17a, 17b, 17c, 17d that transfer output power supplied from the differential gears 16f, 16r, to the tires 18a, 18b, 18c, 18d.

While the construction vehicle of the present embodiment includes two traveling motors, 7 and 7b, and two traveling inverters, 8 and 8b, the present invention is not restrictive as to the numbers of these elements and may include one traveling motor and one traveling inverter or four traveling motors and four traveling inverters. For simplicity of description, the following describes the vehicle configuration with one traveling motor and one traveling inverter.

During traveling acceleration, the traveling inverter 8 drives the traveling motor 7 on a power-running basis, and a power-running torque that the traveling motor 7 has generated is transmitted to the tires 18a, 18b, 18c, 18d via the propeller shafts 15f, 15r, the differential gears 16f, 16r, and the drive shafts 17a, 17b, 17c, 17d, thereby speeding up the vehicle.

During travel braking, the traveling inverter 8 drives the traveling motor 7 as an electrical generator, and as with the power-running torque, a regenerative torque that the traveling motor 7 has generated is transmitted to the tires 18a, 18b, 18c, 18d, thereby slowing down the vehicle. Regenerative electrical energy that the traveling motor 7 has generated is generally stored into the capacitor 3 to charge it. The construction vehicle according to the present embodiment further includes a hydraulic brake control valve and hydraulic brake not shown, and the hydraulic brake may be applied to slow down the vehicle when necessary.

Figure 2:
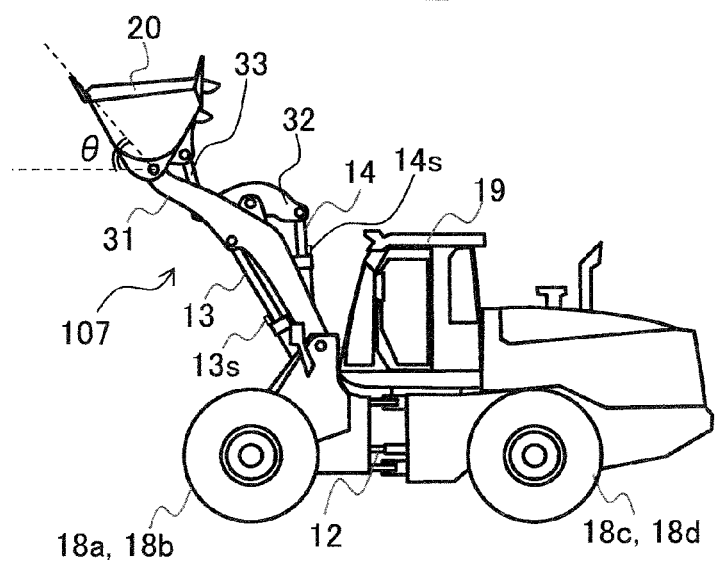
FIG. 2 is a side view of the electrically driven construction vehicle according to the first embodiment of the present invention.

A side view of the electrically driven construction vehicle according to the first embodiment of the present invention is shown in FIG. 2. The same elements as those shown in the previous figure are each assigned the same reference number, and description of the same elements may be omitted herein (the same also applies to the figures that follow). As shown in FIG. 2, the construction vehicle according to the present embodiment includes, on an anterior section of the vehicle, an articulated type of working implement 107 driven by the hydraulic fluid delivered from the main pump 9. The working implement 107 includes a lift arm assembly 31 mounted on the vehicle body so as to be able to oscillate via hinge pins, a lift cylinder 13 mounted between the lift arm 31 and the vehicle body in order to oscillate the lift arm 31, a bucket 20 mounted pivotally via pins at a leading edge of the lift arm assembly 31, a bell crank 32 pivotally mounted on an arm that couples to the lift arm assembly 31, a bucket cylinder 14 mounted between the bell crank 32 and the vehicle body in order to pivot the bucket 20, and a bucket link 33 mounted between the bell crank 32 and the bucket 20. The bucket link 33, the bell crank 32, and the bucket cylinder 14 constitute a linkage for operating the bucket 20, and extension/retraction of the bucket cylinder 14 pivots the bucket 20.

The construction device shown in FIG. 2 allows the operator to enter a cabin 19, then operate the accelerator pedal 101, brake pedal 102, and forward/reverse traveling selector switch 103 shown in FIG. 1, and drive the tires 18a, 18b, 18c, 18d to run the vehicle. The operator can also extend/retract a steering cylinder 12 by operating a steering wheel not shown, and thereby change a direction in which the vehicle is to travel. In addition, operation of the lift lever 104, the bucket lever 105, and the like, allows height and inclination of the bucket 20 to be controlled by extending/retracting the bucket cylinder 14, for excavation and materials/cargo handling.

To avoid wheel slipping, the main controller 100 sets a torque increase rate limit for the traveling motor 7, based upon the lift lever operating signal, the lift stroke signal, and the bucket stroke signal, and thereby limits the driving force. Computation by the main controller 100 is described below.

Figure 3:
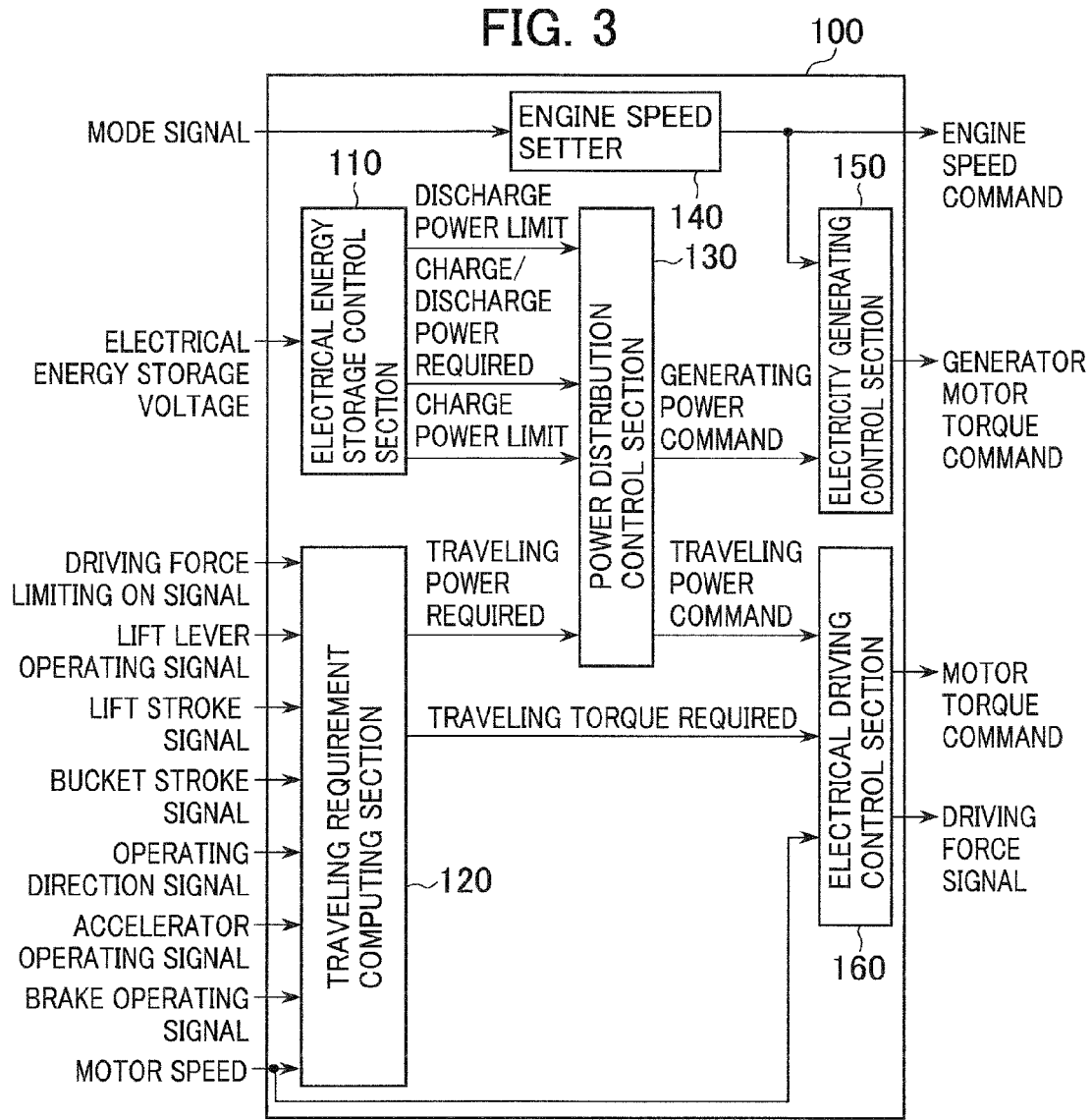
FIG. 3 is a configuration diagram of a main controller 100 in the first embodiment of the present invention.

A configuration of the main controller 100 in the first embodiment of the present invention is shown in FIG. 3. The main controller 100 includes an electrical-power storage control section 110, a traveling requirement computing section 120, a power distribution control section 130, an engine speed setter 140, an electricity-generating control section 150, and an electrical driving control section 160.

The electrical-power storage control section 110 receives the power storage voltage $V_C$ of the capacitor 3 from the converter 4 and computes a charge/discharge power requirement $P_{CR}$, a discharge power limit $P_{CMax}$, and a charge power limit $P_{CMin}$. The electrical-power storage control section 110 uses the following expression to compute the charge/discharge power requirement $P_{CR}$ from a deviation between a power storage target voltage $V_{CT}$ and the power storage voltage $V_C$:

(Numerical expression 1)

$$P_{CR} = \left(K_P + \frac{K_I}{s}\right)(V_{CT} - V_C) \quad (1)$$

where "s" denotes a Laplace operator and $K_P$ and $K_I$ denote a proportional gain and integral gain, respectively, of known PI control. Although the power storage target voltage $V_{CT}$ here is a fixed value, this voltage may for example take a variable value according to motor speed, that is, traveling speed.

Figure 4:
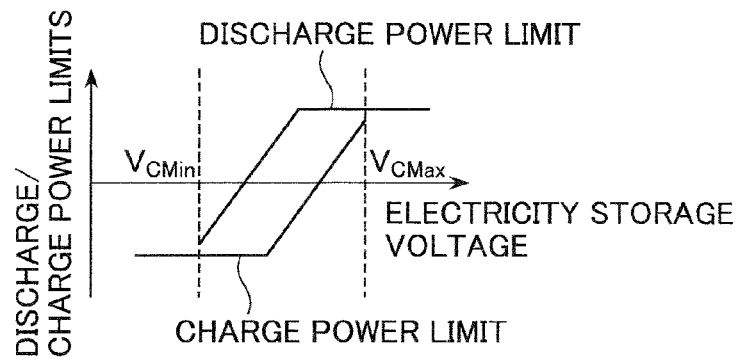
FIG. 4 shows an example of a charge/discharge power limit map in the first embodiment of the present invention.

Next, the electrical-power storage control section 110 uses a charge/discharge power limit map to compute the discharge power limit $P_{CMax}$ and the charge power limit $P_{CMin}$ from the power storage voltage $V_C$. An example of a charge/discharge power limit map is shown in FIG. 4. The map shown in FIG. 4 denotes the power storage voltage $V_C$ on its horizontal axis, and dotted lines $V_{CMax}$ and $V_{CMin}$ in the figure denote an upper voltage limit and lower voltage limit, respectively, of the capacitor 3. As the power storage voltage $V_C$ increases, the discharge power limit $P_{CMax}$ goes farther toward/on a positive side, and as the power storage voltage $V_C$ decreases, the charge power limit $P_{CMin}$ goes farther toward/on a negative side. In addition, the map is preset so that as the power storage voltage $V_C$ approaches the lower voltage limit $V_{CMin}$, the discharge power limit $P_{CMax}$ shifts farther toward/on the negative side (charge side), and so that as the power storage voltage $V_C$ approaches the upper voltage limit $V_{CMax}$, the charge power limit $P_{CMin}$ shifts farther toward/on the positive side (discharge side). The reason for this will be discussed in a later description of the power distribution control section 130.

The traveling requirement computing section 120 computes a traveling torque requirement and a traveling power requirement from the driving force limiting ON signal, the lift lever operating signal, the lift stroke signal, the bucket stroke signal, the operating direction signal, the accelerator signal, the brake signal, and the motor speed.

A configuration of the traveling requirement computing section 120 is shown in FIG. 5. As shown in FIG. 5, the traveling requirement computing section 120 includes a locked bucket state determining unit 121 (locked bucket state determining means), a traveling reference torque computing unit 122, a traveling torque requirement computing unit 123 (traveling torque requirement computing means), and a traveling power requirement computing unit 124.

The locked bucket state determining unit 121 uses the lift lever operating signal, the lift stroke signal, and the bucket stroke signal, to determine whether the bucket is in a locked state. The locked bucket state means a state in which the lift arm 31 does not rise despite the fact that the operator has given a raising instruction to the lift arm 31 by operating the lift lever 104 (an operating device). An example is one in which, during the excavation with the wheel loader, after the bucket 20 has been traveled forward and plunged into the object and the lift arm 31 has been instructed to rise, neither the lift arm 31 nor the bucket 20 can rise any further since the bucket 20 has been plunged too deeply and the object has become heavier than expected.

A flowchart of the blocked bucket state determination by the locked bucket state determining unit 121 is shown in FIG. 6.

First, in step S1211, whether a stroke of the lift cylinder 13 is equal to or less than a predetermined threshold value (a first stroke threshold) is determined using the lift stroke signal that is output from the lift stroke sensor 13s, and if a result of the determination is positive ('Yes'), process control is advanced to step S1212. If the determination result is negative ('No'), process control is skipped to step S1216. The first stroke threshold here is a value for determining whether the bucket 20 is present at excavation height (basically, a relatively low vertical position that is substantially equal to that of a road surface), and this value is set to equal or exceed an end-of-excavation stroke of the lift cylinder.

In step S1212, whether a stroke of the bucket cylinder 14 is equal to or less than a predetermined threshold value (a second stroke threshold) is determined using the bucket stroke signal that is output from the bucket stroke sensor 14s, and if a result of the determination is positive ('Yes'), process control is advanced to step S1213. If the determination result is negative ('No'), process control is skipped to step S1216. The second stroke threshold here is a value for determining whether the bucket 20 is in a posture suitable for scooping the object to be carried (i.e., whether the bucket is taking up a position in which it is tilted to some extent). More specifically, the second stroke threshold is the bucket cylinder stroke obtained in a case that when a line extending from the leading edge of the lift arm 31 (i.e., a proximal end of the bucket 20) to a distal end of the bucket 20 that is closer to the ground surface forms an angle θ (see FIG. 2) with respect to the road surface, the bucket 20 faces upward for the angle θ to be at least 30 degrees, for example. Applying a driving force when the bucket is in a somewhat upward-facing condition presses a bottom of the bucket against the object and thus generates a force that pushes the bucket 20 upward, which is effective for preventing the locked bucket state from arising.

In step S1213, whether a bucket raising instruction has been given from the operator is determined using the lift lever operating signal that is output from the lift potentiometer 104s, and if a result of the determination is positive ('Yes'), process control is advanced to step S1214. If the determination result is negative ('No'), process control is skipped to step S1216. The determination in step S1213 is to confirm, from the lift lever operating signal, that an actuating signal for raising the lift arm 31 has been output from the lift lever 104 (an operating device).

In step S1214, a speed at which the lift cylinder 13 extends/retracts, that is, an operating speed of the lift cylinder is computed by, for example, a known differential arithmetic operation based upon on the lift stroke signal that is output from the lift stroke sensor 13s, and whether the lift cylinder speed is equal to or less than a predetermined threshold value (a lift speed threshold) is determined. If a result of the determination is positive ('Yes'), process control is advanced to step S1215. If the determination result is negative ('No'), process control is skipped to step S1216. The flowchart assumes that the lift speed threshold here is set to be equal to or less than a speed at which the lift cylinder operates when a flow rate of the fluid delivered from the main pump 9 is minimized. The lift cylinder speed is substantially proportional to a rate at which the lift arm 31 or the bucket 20 rises. For this reason, the determination in step S1214 may be based upon the rising rate of the lift arm or that of the bucket.

Step 1215 envisages the positive result of the locked bucket state determination. Step S1216 envisages the negative result of the locked bucket state determination.

In the example of FIG. 6, the positive result of the locked bucket state determination is obtained upon the advancement of process control to step S1215. For prevention of a determination error, however, the result of the locked bucket state determination may be made to become positive, only if step S1215 is reached several times in succession. In addition, although the fact that the positive result of the locked bucket state determination is obtained means that the driving force will not increase as described later herein, in terms of avoiding possible operator's stressing due to reduction control of the driving force, the result of the locked bucket state determination may be changed to negative, if it can be determined that the state in which the positive result of the locked bucket state determination is obtained continues for at least a fixed time and that the state in which the bucket raising instruction also continues for at least a fixed time. If the result of the locked bucket state determination becomes negative, the driving force will return to normal as described later herein.

Figure 7:
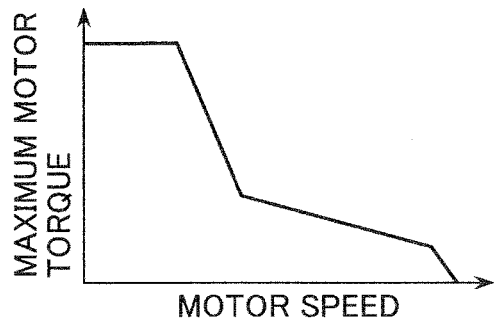
FIG. 7 shows an example of a maximum motor torque map in the first embodiment of the present invention.

The traveling reference torque computing unit 122 computes a traveling reference torque $T_{DB}$ from the accelerator operating signal and the motor speed. First, the traveling reference torque computing unit 122 uses a maximum motor torque map to compute a maximum motor torque $T_{DMax}$ from the motor speed. An example of a maximum motor torque map is shown in FIG. 7. This map is the same as a characteristics curve of a maximum torque for the rotating speed of the traveling motor 7.

Next, on the basis of the accelerator operating signal, the traveling reference torque computing unit 122 computes the traveling reference torque $T_{DB}$ from the maximum motor torque $T_{DMax}$ and an acceleration ratio $r_{ACC}$ obtained by converting the operation amount of the accelerator pedal 101 into a ratio (any value from 0 to 1). The computation uses the following expression:

(Numerical expression 2)

$$T_{DB} = T_{DMax} \cdot r_{Acc} \qquad (2)$$

In addition, the brake operating signal may be used to conduct corrections for the traveling reference torque $T_{DB}$ to decrease as the operation amount of the brake pedal 102 increases.

The traveling torque requirement computing unit 123 computes the traveling torque requirement $T_{DR}$ from the driving force limiting ON signal, the operating direction signal, the locked bucket state determination result, and the traveling reference torque $T_{DB}$.

The traveling torque requirement computing unit 123 uses the following expression to compute the traveling torque requirement $T_{DR}$ from the operating direction signal $C_D$ (forward travel: 1, stop: 0, or reverse travel: −1) and the traveling reference torque $T_{DB}$:

(Numerical expression 3)

$$T_{DR} = C_D \min(T_{DB}, T_{DR\_z} + dT_{DUp}) \quad (3)$$

where $T_{DR\_z}$ denotes a previous value (say, a value obtained before one control period) of the traveling torque requirement $T_{DR}$, and $dT_{DUp}$ denotes the torque increase rate limit value per control period, computed using a torque increase rate limit map.

Figure 8:
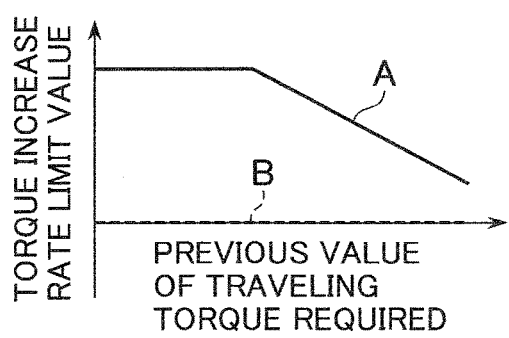
FIG. 8 shows an example of a torque increase rate limit map in the first embodiment of the present invention.

An example of a torque increase rate limit map is shown in FIG. 8. As shown in this figure, if the driving force limiting ON signal is inactive (i.e., the driving force limiting switch 106 is set to OFF) or the locked bucket state determination result is negative, the torque increase rate limit value $dT_{DUp}$ is set from the previous value of the traveling torque requirement, $T_{DR\_z}$, to obey a characteristics curve denoted by solid line A in the figure. That is to say, the torque increase rate limit value $dT_{DUp}$ is set to decrease as the previous value $T_{DR\_z}$ of the traveling torque requirement increases. Conversely if the driving force limiting ON signal is active and the locked bucket state determination result is positive, $dT_{DUp}$ is set from the previous value of the traveling torque requirement, $T_{DR\_z}$ obeys a characteristics curve denoted by dotted line B in the figure. That is to say, the torque increase rate limit value $dT_{DUp}$ is set to zero, irrespective of the previous value $T_{DR\_z}$ of the traveling torque requirement. For these reasons, assuming that the driving force limiting ON signal is active, the torque increase rate limit value $dT_{DUp}$ derived if the determination result of the locked bucket state is positive (i.e., a limit value for a traveling torque requirement increase rate) will be reduced below $dT_{DUp}$ derived if the determination result of the locked bucket state is negative.

It has been described that on this map, the torque increase rate limit value dTDUp that obeys solid line A will decrease as the previous value $T_{DR\_z}$ of the traveling torque requirement increases. Solid line A, however, may be a substantially straight line denoting that $T_{DR\_z}$ is a fixed value. In other words, if the driving force limiting ON signal is active and the locked bucket state determination result is positive, the setting of the torque increase rate limit value needs only to be smaller than in other cases, and dotted line B needs only to exist below solid line A.

Figure 9:
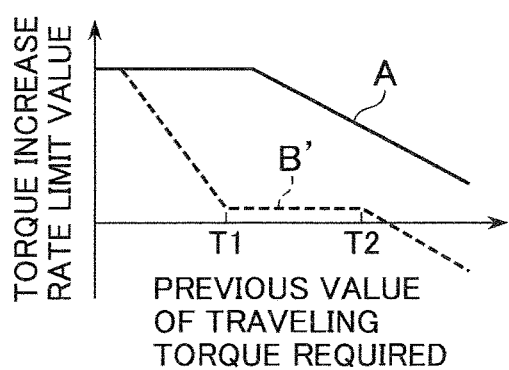
FIG. 9 shows another example of a torque increase rate limit map in the first embodiment of the present invention.

Alternatively if the driving force limiting ON signal is active and the locked bucket state determination result is positive, the torque increase rate limit value $dT_{DUp}$ may be set to obey dotted line B' on a torque increase rate limit map shown in FIG. 9. More specifically, if the previous value $T_{DR\_z}$ of the traveling torque requirement is smaller than T1, the torque increase rate limit value $dT_{DUp}$ may be increased as that value decreases, and if the previous value $T_{DR\_z}$ of the traveling torque requirement is larger than T2 (T1<T2), the torque increase rate limit value $dT_{DUp}$ may be reduced below zero. While the previous value $T_{DR\_z}$ of the traveling torque requirement is between T1 and T2, either a value slightly larger than zero, or as indicated by dotted line B in FIG. 8, zero may be set. Thus, wheel slipping can be avoided more reliably because, as the previous value $T_{DR\_z}$ of the traveling torque requirement increases, the torque increase rate limit value $dT_{DUp}$ will decrease and when the torque increase rate limit value $dT_{DUp}$ becomes negative, the traveling torque requirement $T_{DR}$ will gradually decrease.

When the torque increase rate limit map shown in FIG. 9 is to be used, if the determination result on the bucket raising instruction (in step S1213) is negative, dotted line B in the figure may be used, irrespective of the locked bucket state determination result. This will also enable wheel slipping to be avoided because an increase in driving force will be limited in a case that the bucket 20 is not being raised and the wheels are low in contact pressure.

In above expression (3), the torque increase rate limit value $dT_{DUp}$ determined as above will be used to conduct a comparison between the traveling reference torque $T_{DB}$ defined according to the particular operation amount of the accelerator pedal, and a value obtained by adding the torque increase rate limit value $dT_{DUp}$ to a previous value $T_{DB\_z}$ of the traveling reference torque, and then to compute a minimum value between both, as an absolute value of the traveling torque requirement $T_{DR}$. Accordingly, when the operator steps on the accelerator pedal more strongly (the operation amount of the accelerator pedal 101 is increased), the traveling torque requirement $T_{DR}$ will increase at the rate limited by the torque increase rate limit value $dT_{DUp}$, or when the operator's hold of the accelerator pedal is loosened (the operation amount of the accelerator pedal 101 is reduced), the traveling torque requirement $T_{DR}$ will decrease without being limited. In expression (3), when the value obtained by adding the torque increase rate limit value $dT_{DUp}$ to a previous value $T_{DB\_z}$, of the traveling reference torque is selected as the traveling torque requirement $T_{DR}$, the torque increase rate limit value $dT_{DUp}$ will be an increase rate limit value for the traveling torque requirement $T_{DR}$ (the torque required of the traveling drive device).

The power distribution control section 130 uses the following expression to compute a traveling power command $P_D^*$ from the traveling power requirement $P_{DR}$, the discharge power limit $P_{CMax}$, and the charge power limit $P_{CMin}$:

(Numerical expression 4)

$$P_D^* = P_{DR} + \min(P_{CMax}, 0) + \max(P_{CMin}, 0) \quad (4)$$

The electrical-power storage control section 110 controls electrical energy so that a decrease in storage voltage sets the discharge power limit $P_{CMax}$ to a negative value and so that an increase in storage voltage sets the charge power limit $P_{CMin}$ to a positive value. In above expression (4), therefore, the decrease in storage voltage causes a power value (positive) of the traveling power command $P_D^*$ in power-running mode to be limited, and the increase in storage voltage causes a power value (negative) of the traveling power command $P_D^*$ in regeneration mode to be limited.

Alternatively, instead of expression (4), actual electricity-generating power $P_G$ may be detected/estimated and the traveling power command $P_D^*$ may be computed using the following expression:

(Numerical expression 5)

$$P_D^* = \begin{cases} \min(P_{DR}, P_G + P_{CMax}) & (P_{DR} \geq 0) \\ \max(P_{DR}, P_{CMin}) & (P_{DR} \geq 0) \end{cases} \quad (5)$$

In addition, the power distribution control section 130 uses the following expression to compute an electricity-generating power command $P_G^*$ from the traveling power requirement $P_{DR}$ and the charge/discharge power requirement $P_{CR}$:

(Numerical expression 6)

$$P_G^* = P_{DR} - P_{CR} \quad (6)$$

The engine speed setter 140 computes an engine speed command $N_E^*$. The engine speed command $N_E^*$ may be a maximum speed of the engine 1 or a mode selector switch may be mounted on the controller 100 so that the operator can manually select any value and/or adjust a current setting. In another alternative example, engine power may be estimated from information supplied from the engine controller 2, and then the engine speed command $N_E^*$ may be computed so that the engine will run at the most efficient operating point obtainable.

The electricity generating control section 150 uses the following expression to compute a generator motor torque command $T_G^*$ from the engine speed command $N_E^*$ and the electricity-generating power command $P_G^*$:

(Numerical expression 7)

$$T_G^* = -\frac{P_G^*}{N_E^*} \quad (7)$$

While this expression uses the engine speed command $N_E^*$ as a parameter, the engine speed $N_E$ received from the engine controller 2 may instead be used for the computation. Further alternatively, the generator motor torque command $T_G^*$ may be set to decrease (approach zero) as the engine speed $N_E$ approaches a low-idling speed. This will prevent engine stall.

The electrical driving control section 160 computes a motor torque command $T_D^*$ from the traveling torque requirement $T_{DR}$, the traveling power command $P_D^*$, and the motor speed. First, the motor driving control section 160 uses, for example, the maximum motor torque map shown in FIG. 7, to compute the maximum motor torque $T_{DMax}$ from the motor speed.

Next, the electrical driving control section 160 uses the following expression to compute the motor torque command $T_D^*$ from the traveling torque requirement $T_{DR}$, the maximum motor torque $T_{DMax}$, and the traveling power command $P_D^*$. In the following expression, $P_{DMax}$ is maximum motor power:

(Numerical expression 8)

$$T_D^* = \begin{cases} \min\left(T_{DR}, T_{DMax} \frac{|P_D^*|}{P_{DMax}}\right) & (T_{DR} \geq 0) \\ \max\left(T_{DR}, -T_{DMax} \frac{|P_D^*|}{P_{DMax}}\right) & (T_{DR} < 0) \end{cases} \quad (8)$$

The electrical driving control section 160 also uses the following expression to compute a driving force display value $F_D^*$ from the motor torque command $T_D^*$. In the following expression, RDif is a gear ratio of the differential gears 16f, 16r, and Rw is a radius of the tires 18a, 18b, 18c, 18d.

(Numerical expression 9)

$$F_D^* = \frac{R_{Dif} \cdot T_D^*}{R_W} \quad (9)$$

Operation of the construction vehicle applying the present invention is described below using FIG. 10. For a clearer understanding of advantageous effects of the invention, the description given here assumes that during the excavation, the accelerator pedal 101 is kept free of operator adjustments and fully stepped on at all times (i.e., the operation amount of the accelerator pedal 101 is constant).

Section (a) of FIG. 10 shows how the operation amount of the accelerator pedal 101, the wheel speed, the driving force of the traveling motor 7, the stroke length of the lift cylinder 13, and the stroke length of the bucket cylinder 14 vary with time when the present invention is not applied (i.e., when neither the locked bucket state determining unit 121 is included nor the torque increase rate limit values denoted by solid lines B, B' in FIGS. 8 and 9 are present).

The example shown in section (a) of FIG. 10 applies to a state in which, until time T1 is reached, the vehicle will be traveling under normal conditions, and at the time T1, the bucket 20 will come into contact with the object to be carried, and then start the excavation. Since contact with the object to be carried will begin at the time T1, the wheel speed (the motor speed) will decrease and the driving force of the traveling motor 7 will increase in accordance with the maximum motor torque map of FIG. 7.

Next, in order to raise the bucket 20, the operator starts operating the lift lever 104 from time T2. This increases the stroke of the lift cylinder 13. If the bucket is directed upward too early (i.e., the bucket 20 has its opening directed upward too early), the amount of object scooped with the bucket 20 will be lessened, so the operator generally starts operating the bucket lever 105 with a slight delay in timing behind the operations on the lift lever 104. For this reason, the stroke of the bucket cylinder 14 increases with a slight delay behind the increase in the stroke of the lift cylinder 13.

After that, the locked bucket state arises at time T3. Once the locked bucket state has arisen, the bucket 20 (the lift arm 31) cannot be raised despite the fact that the operation of the lift lever 104 is continued until the bucket has been directed upward. If the present invention is not applied, even after the locked bucket state has arisen, the driving force continues to increase, which causes the wheels to slip at time T4 and increases the wheel speed. After this, the bucket cylinder stroke increases at time T5 and then when the bucket is directed upward, the locked bucket state is cleared and the bucket 20 (the lift arm 31) rises.

Section (b) of FIG. 10 shows how the operation amount of the accelerator pedal 101 and other quantities vary with time when the present invention is applied. The following description assumes the use of the torque increase rate map shown in FIG. 8. Vehicle operation up to time T3 is substantially the same as in section (a) of FIG. 10. When the present invention is applied, however, the locked bucket state determining unit 121 first conducts the locked bucket state determination at the time T3 in accordance with the lift stroke signal and the flowchart of FIG. 6, and determines the locked bucket state to be occurring. After receiving this determination result, the traveling torque requirement computing unit 123 assigns zero to the torque increase rate limit value $dT_{DUp}$ in accordance with dotted line B in FIG. 8. This means that the limit value $dT_{DUp}$ is reduced below a value applied when the lift arm 31 rises as instructed from the operator. Accordingly, the driving force does not increase, even after T3. Wheel slipping can thus be avoided.

In addition, if the fact that the stroke of the bucket cylinder 14 has exceeded the second stroke threshold (dashed line A in the figure) is detected at time T4' in accordance with the bucket stroke signal and the bucket is found to be directed upward to some extent, the determination result on the locked bucket state becomes negative in accordance with step S1212 of FIG. 6. Therefore, the traveling torque requirement computing unit 123 that has received this determination result sets the torque increase rate limit value $dT_{DU_P}$ in accordance with solid line A in FIG. 8. This increases the driving force once again and hence after the locked bucket state has been cleared, enables the vehicle to continue the excavation without making the operator feel a lack of driving force.

In the present embodiment of the above configuration, therefore, if the locked bucket state arises during raising operations on the object to be carried, the increase in the driving force of the traveling motor 7 is suppressed, which in turn allows the suppression of wheel slipping due to the locked bucket state. Briefly, wheel slipping due to too deep plunging of the bucket into the object to be handled can be avoided.

A second embodiment of the present invention is described below. The present embodiment is an example of application of the invention to a construction vehicle having a torque converter type of automatic transmission.

Figure 11:
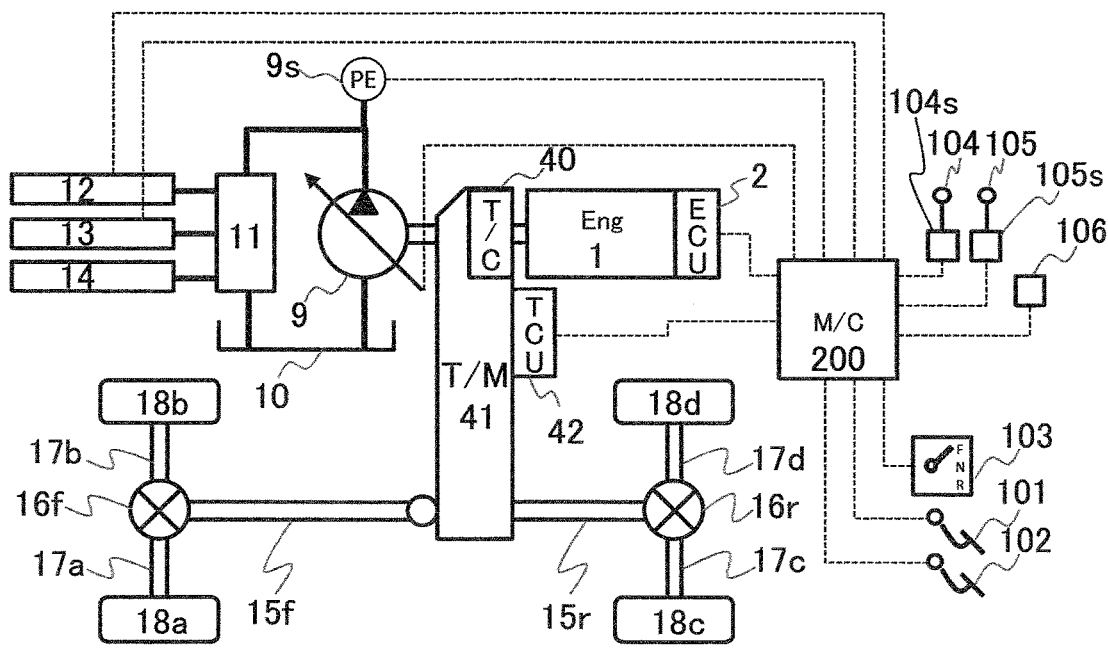
FIG. 11 is a configuration diagram of a construction vehicle according to a second embodiment of the present invention.

FIG. 11 is a configuration diagram of the construction vehicle according to the second embodiment of the present invention. The configuration of the construction vehicle shown in this figure differs from that of the construction vehicle shown in FIG. 1. That is to say, the construction vehicle according to the second embodiment includes a torque converter (T/C) 40, a transmission (T/M) 41, a transmission control unit (TCU) 42, and a main controller 200 as an alternative to the main controller in the first embodiment. In the second embodiment, the torque converter (T/C) 40 and the transmission 41 function as elements of a traveling drive device.

The transmission controller 42 detects a rotating speed $N_P$ of the propeller shafts 15f, 15r and determines a gear ratio $R_{TM}$ of the transmission 41 according to the particular speed $N_P$ of the propeller shafts. The transmission controller 42 also transmits the propeller shaft speed $N_P$ and the transmission gear ratio $R_{TM}$ to the main controller 200.

The main controller 200, as with the main controller in the first embodiment, transmits an engine speed command to the engine controller 2. A torque that the torque converter 40 outputs changes according to engine speed. Accordingly, the main controller 200 in the second embodiment controls driving force in accordance with the engine speed command.

Figure 12:
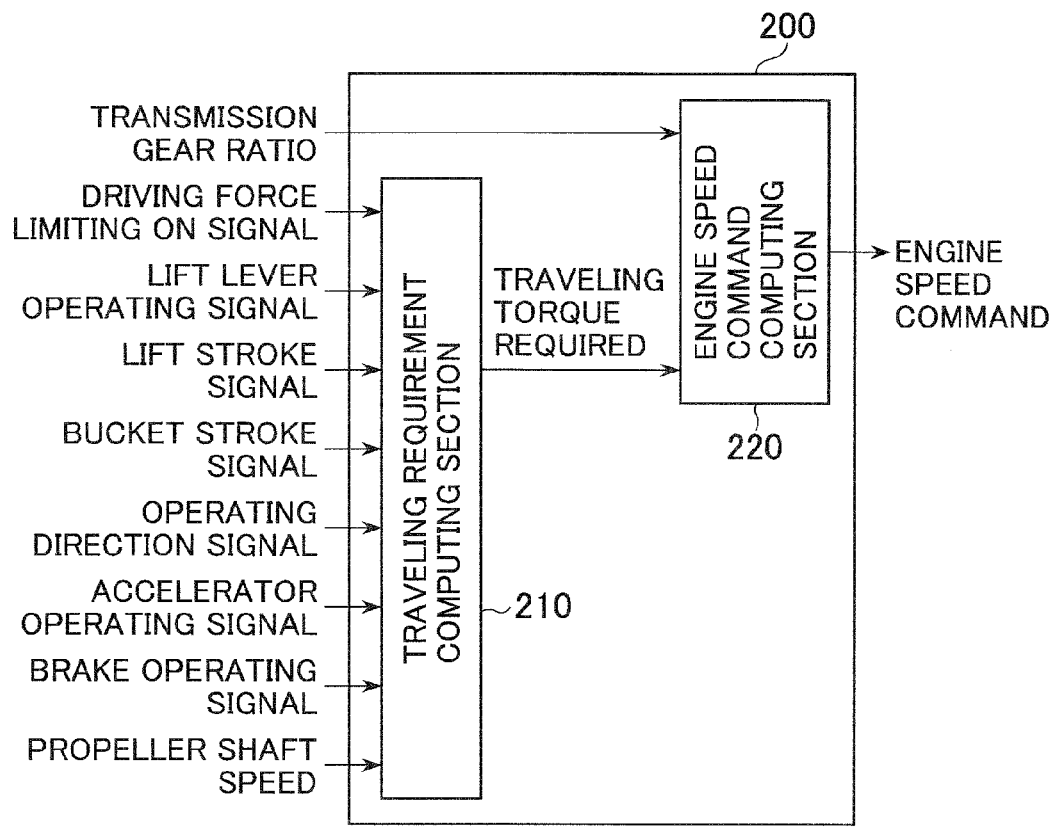
FIG. 12 is a configuration diagram of a main controller 200 in the second embodiment of the present invention.

A configuration of the main controller 200 is shown in FIG. 12. The main controller 200 includes a traveling requirement computing section 210 and an engine speed command computing section 220.

Except in that the motor speed in the first embodiment is replaced by the propeller shaft speed $N_P$ and in that a vertical axis of the maximum motor torque map shown in FIG. 7 is replaced by a maximum transmission torque, the traveling requirement computing section 210 is substantially the same as the traveling requirement computing section 120 of the main controller 100 described in the first embodiment. That is, the traveling requirement computing section 210, as with the traveling requirement computing section 120, includes a locked bucket state determining unit 121 and a traveling torque requirement computing unit 123, and finally outputs a traveling torque requirement $T_{DR}$. Thus, if the locked bucket state determining unit 121 exhibits a positive determination result on occurrence of a locked bucket state (i.e., determines the locked bucket state to be occurring), the traveling torque requirement computing unit 123 reduces a torque increase rate limit value in accordance with dotted line B shown in FIG. 8, and consequently the engine speed is reduced, for which reason, wheel slipping is avoided as in the first embodiment. Since the engine speed (the engine speed command $N_E^*$) is proportional to driving force, the driving force is reduced if the locked bucket state arises.

The engine speed command computing section 220 computes the engine speed command $N_E^*$ from the transmission gear ratio $R_{TM}$ and the traveling torque requirement $T_{DR}$. First, the engine speed command computing section 220 uses the following expression to compute a torque converter torque requirement $T_{TCR}$ from the transmission gear ratio $R_{TM}$ and the traveling torque requirement $T_{DR}$:

(Numerical expression 10)

$$T_{TCR} = \frac{T_{DR}}{R_{TM}} \qquad (10)$$

The engine speed command computing section 220 also uses the following expression to compute a torque converter output shaft speed $N_{TC}$ from the transmission gear ratio $R_{TM}$ and the propeller shaft speed $N_P$:

(Numerical expression 11)

$$N_{TC} = R_{TM} \cdot N_P \qquad (11)$$

Figure 13:
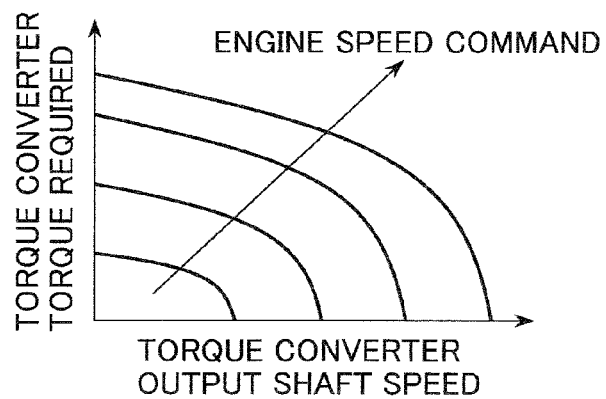
FIG. 13 shows an example of a torque converter torque map in the second embodiment of the present invention.

Next, the engine speed command computing section 220 uses a torque converter torque map to compute the engine speed command $N_E^*$ from the torque converter torque requirement TTCR and the torque converter output shaft speed $N_{TC}$. An example of a torque converter torque map is shown in FIG. 13. The torque converter torque map can be created by conducting independent torque-converter experiments. The engine 1 is controlled in accordance with the engine speed command $N_E^*$ computed by the engine speed command computing section 220.

In the construction vehicle according to the present embodiment of the above configuration, therefore, if the locked bucket state arises during raising operations on the object to be carried, an increase in a driving force of the traveling motor 7 is also suppressed, which in turn allows suppression of wheel slipping due to the locked bucket state.

While the use of the lift stroke sensor 13s as bucket height acquisition means has been described in the above two embodiments of the present invention, a lift angle sensor that detects an angle of the lift cylinder 13 or lift arm 31 relative to a predetermined reference surface (e.g., the ground surface) may be used as the bucket height acquisition means. An operation for conversion from angle to height is naturally conducted in that case.

In addition, although the use of the bucket stroke sensor 14s as bucket posture acquisition means has been described, a bucket angle sensor that detects an angle of the bucket cylinder 14 or bell crank 32 relative to a predetermined reference surface (e.g., the ground surface) may be used as the bucket posture acquisition means.

Furthermore, while the lift lever 104 has been described as bucket raising instruction acquisition means, a control valve 11 may be used, instead of the lift lever, as the bucket raising instruction acquisition means. In step S1213 of FIG. 6, a positive determination result may be derived if the lift-up hydraulic chamber (bottom-end hydraulic chamber) in the lift cylinder 13 is made to communicate with the main pump 9, and a negative determination result may be derived in practically all other cases.

Moreover, it has been described that the locked bucket state determination based upon the fact that the lift cylinder speed is equal to or less than the lift speed threshold is conducted in step S1214 of the locked bucket state determination shown in FIG. 6. This determination, however, may instead be based upon the fact that the bottom-end pressure in the lift cylinder 13 or the delivery pressure of the main pump 9 is equal to or higher than a predetermined lift pressure threshold. That is to say, a positive determination result may be derived when the pressure in either the lift cylinder 13 or the main pump 9 is equal to or higher than the lift pressure threshold, and a negative determination result may be derived when the pressure is less than the lift pressure threshold. The lift pressure threshold is desirably set below a relief pressure (e.g., to a 1-MPa lower pressure than the relief pressure) of the hydraulic circuit relating to the lift cylinder 13 and the main pump 9. Additionally in that case, the delivery pressure in the main pump 9 will be detected with the pump pressure sensor 9s, and the bottom-end pressure in the lift cylinder 13 will be detected with a pressure sensor placed on the hydraulic circuit extending from the main pump 9 to the bottom-end hydraulic chamber.

In the first and second embodiments, as shown in FIG. 6, whether the locked bucket state is occurring has been determined allowing for the lift cylinder stroke, bucket cylinder stroke, bucket raising instruction, and lift cylinder speed in steps S1211 to S1214), and the rate at which the traveling torque requirement increases has been limited according to a particular result of the determination. As will be next described, however, an excavation state determination may be conducted and the rate at which the traveling torque requirement increases may be limited according to the particular delivery pressure of the main pump 9 (or the particular bottom-end pressure of the lift cylinder 13). Next, this example is described below as a third embodiment of the present invention.

Figure 14:
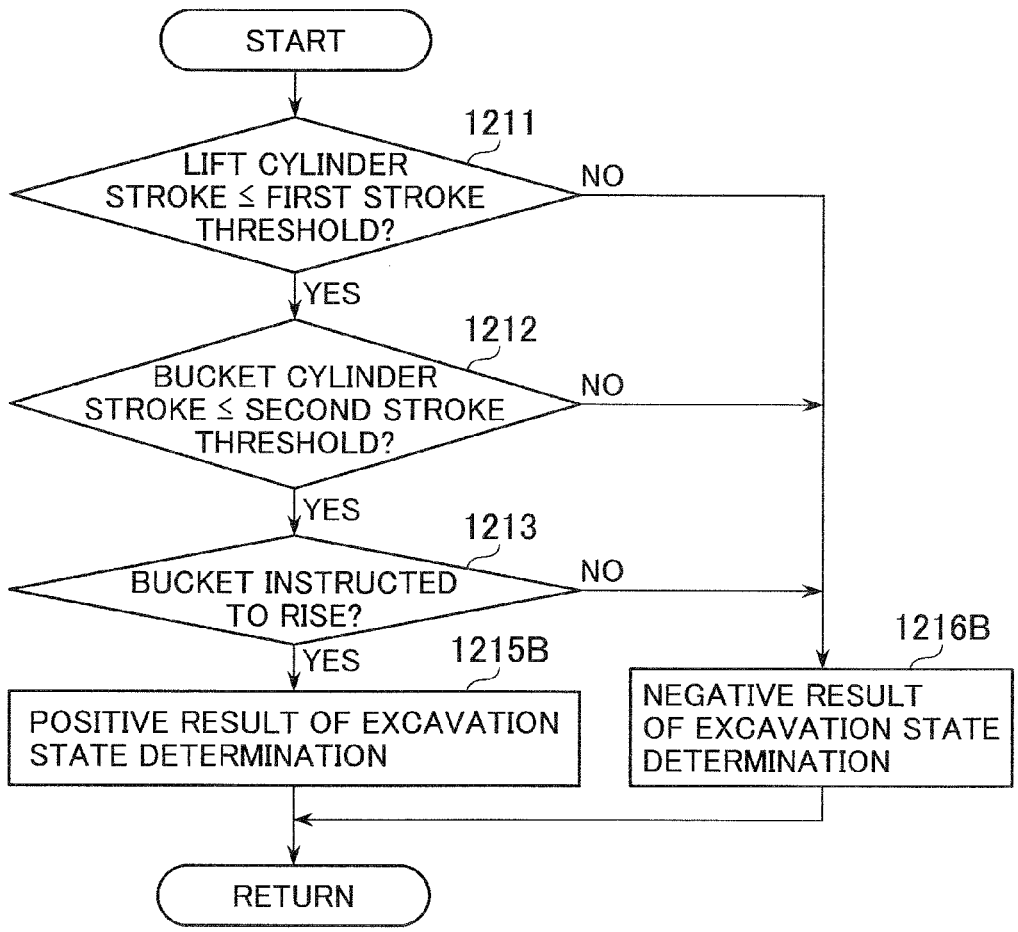
FIG. 14 is a flowchart of excavation state determination in a third embodiment of the present invention.

FIG. 14 is a flowchart of the excavation state determination conducted by the locked bucket state determining unit 121 in the third embodiment of the present invention. The locked bucket state determining unit 121 in the present embodiment conducts the excavation state determination instead of the locked bucket state determination. The flowchart of FIG. 14 is equivalent to one obtained by omitting step S1214 from the flowchart of FIG. 6, and the locked bucket state determining unit 121 conducts the excavation state determination through the process ranging from step S1211 to step S1213. For descriptive simplicity, the following description assumes that the driving force limiting switch 106 is maintained in its ON state at all times.

Figure 15:
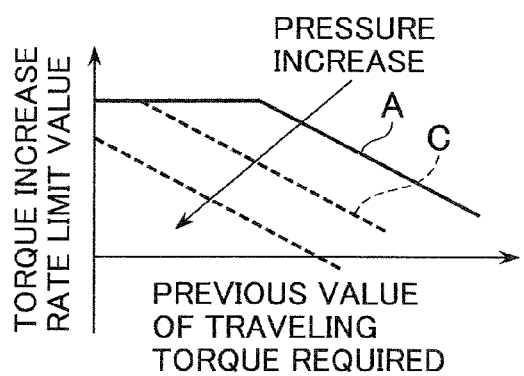
FIG. 15 shows an example of a torque increase rate limit map in the third embodiment of the present invention.

FIG. 15 shows another example of a torque increase rate limit map in the third embodiment of the present invention. The traveling torque requirement computing unit 123 sets the torque increase rate limit value based upon the map shown in FIG. 15. Solid line A in this figure is used for the traveling torque requirement computing unit 123 to calculate a torque increase rate limit value corresponding to a negative result of the excavation state determination. Solid line A is the same as those shown in FIGS. 8, 9. Dotted line C in FIG. 15 is used for the traveling torque requirement computing unit 123 to calculate a torque increase rate limit corresponding to a positive result of the excavation state determination.

In a case of dotted line C, the torque increase rate limit is set to decrease with increases in a delivery pressure of the main pump 9 or a bottom-end pressure of the lift cylinder 13 (i.e., a load acting upon the main pump 9 or the lift cylinder 13). The pump pressure sensor 9s can be used to detect the delivery pressure of the main pump 9, and a pressure sensor placed on the hydraulic circuit extending from the main pump 9 to the bottom-end hydraulic chamber can be used to detect the bottom-end pressure of the lift cylinder 13.

In the present embodiment of the above configuration, if the result of the excavation state determination by the locked bucket state determining unit 121 per the flowchart of FIG. 14 is negative (step S1216B), the traveling torque requirement computing unit 123, as in the first embodiment, sets the torque increase rate limit value $dT_{DUp}$ from the previous value of the traveling torque requirement, $T_{DR\_z}$, on the basis of solid line A in FIG. 15. Conversely if the result of the excavation state determination is positive (step S1215B), the traveling torque requirement computing unit 123 sets the torque increase rate limit value $dT_{DUp}$ on the basis of dotted line C in FIG. 15. In other words, the traveling torque requirement computing unit 123 sets the torque increase rate limit value $dT_{DUp}$ to decrease with the increases in the delivery pressure of the main pump 9 (or the bottom-end pressure of the lift cylinder 13). Thus, the torque increase rate limit value $dT_{DUp}$ corresponding to the positive result of the excavation state determination is reduced with the increases in the delivery pressure of the main pump 9 or the bottom-end pressure of the lift cylinder 13. Even if the increases in the delivery pressure of the main pump 9 or the bottom-end pressure of the lift cylinder 13 are regarded as meaning the occurrence of the locked bucket state, the occurrence of wheel slip can be reduced as in the earlier embodiments of the present invention.

While the above three embodiments have each been described taking a wheel loader as an example of the construction vehicle, the present invention can also be applied to forklift trucks, for example. In a case of forklift trucks, despite a fork lifting instruction being imparted, an object to be carried may weigh too much for the vehicle to lift forks, but the present invention enables the suppression of wheel slipping, even in such a case.

DESCRIPTION OF REFERENCE NUMBERS

1: Engine
2: Engine controller
3: Capacitor
4: Converter
5: Electrical generator motor
6: Electricity-generating inverter
7: Traveling motor
8: Traveling inverter
9: Main pump
13: Lift cylinder
13s: Lift stroke sensor
14: Bucket cylinder
14s: Bucket stroke sensor
18a, 18b, 18c, 18d: Tires
19: Cabin
20: Bucket
31: Lift arm
40: Torque converter
41: Transmission
100, 200: Main controllers
104: Operating device (Lift lever)
105: Operating device (Bucket lever)

104s: Lift potentiometer
105: Bucket potentiometer
106: Driving force limiting switch
107: Working implement
120, 210: Traveling requirement computing section
121: Locked bucket state determining unit
123: Traveling torque requirement computing unit

The invention claimed is:

1. A construction vehicle comprising:
a hydraulic pump;
a working implement with a lift arm and a bucket pivotally mounted on the lift arm, the working implement further including, as hydraulic actuators driven by a hydraulic fluid supplied from the hydraulic pump, a lift cylinder for oscillating the lift arm and a bucket cylinder for turning the bucket;
an operating device for operating the working implement;
a traveling drive device for driving wheels; and
a controller configured so that if the lift arm fails to operate despite an operating instruction being imparted to the lift arm via the operating device, and a stroke of the bucket cylinder is equal to or less than a stroke threshold value, the controller reduces a limit value for an increase rate of a torque requirement in the traveling drive device, compared to when the lift arm rises as instructed or when the stroke of the bucket cylinder exceeds the threshold value.

2. The construction vehicle according to claim 1, wherein:
when an operating instruction for raising the lift arm is already output from the operating device and nevertheless a rate at which the lift arm rises is lower than a lift speed threshold value, the controller determines that the working implement has failed to operate despite an operating instruction being imparted to the working implement via the operating device.

3. The construction vehicle according to claim 2, wherein:
if the bucket cylinder is operated through a stroke exceeding the stroke threshold value after the limit value for the torque requirement increase rate in the traveling drive device has been reduced, the controller returns the limit value for the torque requirement increase rate in the traveling drive device back to an original value.

4. The construction vehicle according to claim 1, wherein:
if the bucket cylinder is operated through a stroke exceeding the stroke threshold value after the limit value for the torque requirement increase rate in the traveling drive device has been reduced, the controller returns the limit value for the torque requirement increase rate in the traveling drive device back to an original value.

5. The construction vehicle according to claim 1, wherein:
if the bucket cylinder is operated through a stroke exceeding the setting value after the limit value for the torque requirement increase rate in the traveling drive device has been reduced, the controller returns the limit value for the torque requirement increase rate in the traveling drive device back to an original value.

* * * * *